(12) United States Patent
Raza et al.

(10) Patent No.: US 9,727,880 B2
(45) Date of Patent: Aug. 8, 2017

(54) PREDICTING USER RESPONSES

(75) Inventors: Mohammad Raza, Cambridge (GB); Thore Graepel, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/281,250

(22) Filed: Oct. 25, 2011

(65) Prior Publication Data

US 2013/0103692 A1 Apr. 25, 2013

(51) Int. Cl.
*G06F 7/00* (2006.01)
*G06F 17/30* (2006.01)
*G06Q 30/02* (2012.01)
*G06Q 50/00* (2012.01)

(52) U.S. Cl.
CPC ............. *G06Q 30/02* (2013.01); *G06Q 50/01* (2013.01)

(58) Field of Classification Search
CPC .................................................... G06Q 50/01
USPC ........................................................ 707/751
See application file for complete search history.

(56) References Cited

U.S. PATENT DOCUMENTS

| | | | | |
|---|---|---|---|---|
| 7,720,723 B2* | 5/2010 | Dicker | ................... | G06Q 30/02 705/14.51 |
| 2005/0165600 A1* | 7/2005 | Kasravi | ............... | G06F 17/2211 704/9 |
| 2006/0150180 A1* | 7/2006 | Schmidt | ................. | G06Q 30/02 717/173 |
| 2006/0167874 A1 | 7/2006 | Von Ahn Arellano et al. | | |
| 2006/0179053 A1 | 8/2006 | Von Ahn Arellano et al. | | |
| 2008/0120411 A1* | 5/2008 | Eberle | .................... | G06Q 50/10 709/225 |
| 2008/0209343 A1* | 8/2008 | Macadaan | ............. | G06F 3/0482 715/747 |
| 2008/0275719 A1* | 11/2008 | Davis | ..................... | G06Q 30/02 705/1.1 |
| 2009/0013002 A1* | 1/2009 | Eggink | ............. | G06F 17/30702 |

(Continued)

OTHER PUBLICATIONS

Seth Aaditeshwar, et al; Bayesian Credibility Modeling for Personalized Recommendation in Participatory Media ; User Modeling, Adaptation, and Personalization, 18th International Conference, UMAP 2010, Big Island, HI, USA; Published Date: Jun. 2010 pp. 1-13; Waterloo, ON, Canada http://www.cse.iitd.ernet.in/~aseth/umap.pdf.

(Continued)

*Primary Examiner* — Van Oberly

(57) ABSTRACT

Predicting user responses to items is useful in many application domains, such as personalized information retrieval and recommendation systems. In an embodiment a contacts service identifies contacts of a target user and predictions are elicited from the contacts about the target user's response to an item. In various examples, the predictions are combined taking into account weights of the contacts to produce a prediction of the target user's response. For example, the response may be one or more of: a numerical rating, a word or phrase describing the targets user's opinion of the item and a word or phrase stating a reason that the target user holds the opinion. In examples, accuracy of the predictions is calculated after observing the target user's actual response. The accuracy may be used to calculate and display scores and rankings of the contact's prediction abilities and to update the weights of the contacts.

20 Claims, 5 Drawing Sheets

(56) References Cited

U.S. PATENT DOCUMENTS

| | | | | |
|---|---|---|---|---|
| 2010/0287033 A1* | 11/2010 | Mathur | ............. | G06F 17/30867 705/319 |
| 2010/0312644 A1* | 12/2010 | Borgs | ..................... | G06Q 10/10 705/14.55 |
| 2011/0167115 A1 | 7/2011 | Gilbert et al. | | |

OTHER PUBLICATIONS

David Carmel, et al; Personalized Social Search Based on the User's Social Network; CIKM '09 Proceeding of the 18th ACM conference on Information and knowledge management; Published Date: Nov. 2009; pp. 1227-1236; Haifa, IL. http://www.l3s.de/web/upload/documents/1/CIKM%202009%20pesonalized%20SS.pdf.

Meredith Ringel Morris, et al; A Comparison of Information Seeking Using Search Engines and Social Networks; 4th International AAAI Conference on Weblogs and Social Media (2010); Published Date: May 2010; pp. 291-294; Cambridge, MA, USA http://research.microsoft.com/en-us/um/people/merrie/papers/icwsm_searching_vs_asking.pdf.

Prantik Bhattacharyya, et al; Analysis of User Keyword Similarity in Online Social Networks; Social Network Analysis and Mining, vol. 1, No. 3; Published Date: Jul. 2011; pp. 143-158; Davis, CA, USA http://dsl.cs.ucdavis.edu/~prantik/docs/snam10_keyword.pdf.

Rong Zheng, et al; Social network collaborative filtering; CeDER Working Papers; Published Date: Oct. 22, 2008; pp. 1-23; http://pages.stern.nyu.edu/~fprovost/Papers/sncf-CeDER-8-08.pdf.

The other side of social search; Retrieved on Aug. 1, 2011; http://www.theenvisioners.com/index.php/2011/05/04/the-other-side-of-social-search.

Meet +1: Google's Answer to the Facebook like Button; Retrieved on Aug. 1, 2011; http://searchengineland.com/meet-1-googles-answer-to-the-facebook-like-button-70569.

Cynthia Boris; Bing Partners with Facebook for Personalized Search; The Pilgrim Network, 2010; http://www.marketingpilgrim.com/2010/10/bing-partners-with-facebook-for-personalized-search.html.

Satya Nadella; New Signals in Search: The Bing Social Layer; Bing Search Blog, 2010; http://www.bing.com/community/site_blogs/b/search/archive/2010/10/13/new-signals-in-search-the-bingsocial-layer.aspx.

P. Yiu; Bing's new social features arrive today; Bing Search Blog, 2010; http://www.bing.com/community/site_blogs/b/search/archive/2010/11/02/search-blog-bing-s-new-social-search-features-arrive-today.aspx?wa=wsignin1.0.

Maureen Heymans; Introducing Google Social Search: I finally found my friend's New York blog!; The Official Google Blog, 2009; http://googleblog.blogspot.com/2009/10/introducing-google-social-search-i.html.

Doug Sherrets; Google's Marissa Mayer: Social search is the future; Venture Beat; 2008 http://venturebeat.com/2008/01/31/googles-marissa-mayer-social-search-is-the-future.

Rob Spiro; +1's: the right recommendations right when you want themin your search results; The Official Google Blog, 2011. http://googleblog.blogspot.com/2011/03/1s-right-recommendations-right-whenyou.html.

Ed H. Chi; Information Seeking Can Be Social; Computer, vol. 42 Issue 3. IEEE Computer Society Press, 2009 http://www-users.cs.umn.edu/~echi/papers/2009-IEEE-Computer/IEEE-information-seeking-social-EdChi.pdf.

Digg; Retreived on Aug. 1, 2011 http://www.digg.com.

Delicious; Retreived on Aug. 1, 2011 http://www.delicious.com.

StumbleUpon; Retreived on Aug. 1, 2011 http://www.stumble.com (Given Link) http://www.stumble.com/wp/ (Redirected Link).

ProjectEmporia; Retreived on Aug. 1, 2011 http://www.projectemporia.com (Given Link) http://www.projectemporia.com/#/topStories (Redirected Link).

Amazon Recommendations; Retreived on Aug. 1, 2011 http://www.amazon.com/gp/help/customer/display.html?ie=UTF8&nodeId=13316081.

P. Heymann, et al; Can social bookmarking improve web search?; Proceedings of the International Conference on Web Search andWeb Data Mining. ACM, 2008, Stanford, CA, USA http://www.wsdm2009.org/wsdm2008.org/WSDM2008-papers/p195.pdf.

X. Su, et al; A survey of collaborative filtering techniques; Advances in Artificial Intelligence. Hindawi Publishing Corp, 2009. http://svn6.assembla.com/svn/nttuyen-thesis/docs/trunk/reference/%5B5%5D%20-%20A%20Survery%20of%20Collaborative%20Filtering%20Techniques.pdf.

Michael McDonnell, et al; Social search: A taxonomy of, and a user-centred approach to, social web search; Program: electronic library and information systems, vol. 45 Issue 1. Emerald Group Publishing, 2010.

Mohammad Raza, et al; A new level of social search: discovering the user's opinion before he can make one; Apr. 2011.

* cited by examiner

PREDICTING USER RESPONSES

BACKGROUND

The ability to predict responses of users to items such as goods, services, search results, or other items is useful in many application domains including advertising, product recommendation, information retrieval and others. The response of the user may be his or her mental feeling, view, or opinion of the item. For example, this may be expressed using a rating such as a numerical rating or using words or phrases such as "silly", "nice", "cool" or in other ways.

Existing approaches to predicting responses of users to items attempt to find like-minded users and use knowledge of historical responses of those like-minded users to infer responses. For example, product recommendation systems often make recommendations based on knowledge about people who bought the same product x and also bought other different products which can then be recommended. Other approaches attempt to find users who are connected in a social network and use knowledge of historical responses of those users to infer responses. However, these types of systems have limited prediction accuracy.

Existing information retrieval systems often return results which are not relevant or useful and there is an ongoing need to improve. Users often retrieve many results which are not relevant and suffer from an information overload problem.

The embodiments described below are not limited to implementations which solve any or all of the disadvantages of known user response prediction systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Predicting user responses to items is useful in many application domains, such as personalized information retrieval and recommendation systems. In an embodiment a contacts service identifies contacts of a target user and predictions are elicited from the contacts about the target user's response to an item. In various examples, the predictions are combined taking into account weights of the contacts to produce a prediction of the target user's response. For example, the response may be one or more of: a numerical rating, a word or phrase describing the targets user's opinion of the item and a word or phrase stating a reason that the target user holds the opinion. In examples, accuracy of the predictions is calculated after observing the target user's actual response. The accuracy may be used to calculate and display scores and rankings of the contact's prediction abilities and to update the weights of the contacts.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
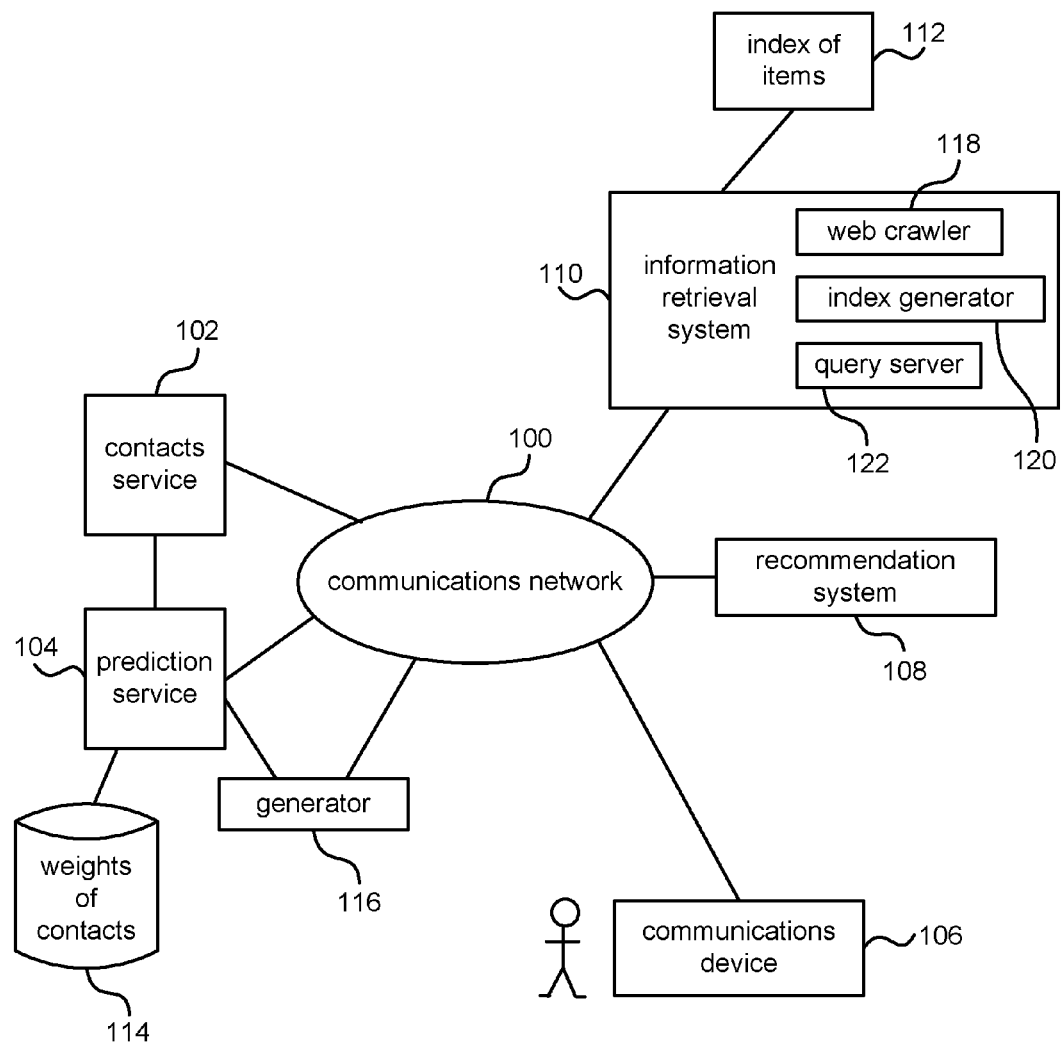
FIG. 1 is a schematic diagram of a prediction service and its relationship to a contacts service, an information retrieval system and a recommendation system.

FIG. 1 is a schematic diagram of a prediction service 104 for use in conjunction with at least one contacts service 102 and a recommendation system 108 and/or an information retrieval system 110. The prediction service 104 is computer-implemented and may be in the form of a web service enabled by one or more web servers or other equipment. It has access to a store of weights of contacts 114 which may be a database or other data structure and which may be integral with or separate from the prediction service 104. The prediction service may have access to a generator 116 for identifying items or users for input to the prediction service 104. The prediction service is arranged to predict responses of target users to items as described in more detail below. The term "item" is used here to refer to a product, service, document, email, blog, web page, news item, article, place, restaurant, book, piece of music, sound recording, image, video, airline, or any other item, part of an item or group of items such as a movie genre, topic, category or group of items represented by a web site. The term "response" is used here to refer to a rating, numerical score, descriptive phrase or word.

A communications network 100, such as the internet, an intranet or any other communications network or networks, interconnects the prediction service 104, contacts service 102, information retrieval system 110 and recommendation system 108. A user with a communications device 106 is able to access the prediction service 104, the contact service 102, the information retrieval system 110 and optionally the recommendation system 108 over the communications network 100. The communications device 106 may be a mobile telephone, a personal digital assistant, a laptop computer, a personal computer, or any other communications device having a web browser. Only one user is illustrated for clarity and in practice many users may be present. It is not necessary for all of the users to access the prediction service. At least some users may give their consent for the prediction service to be used and receive benefits of that during their use of the information retrieval system 110 and/or recommendation system.

The contacts service 102 may be a social network service, a professional network service or other service which stores knowledge about relationships between users where consent to do so has been given by the users and where privacy and security levels are appropriate. Only one contacts service 102 is shown in FIG. 1 for clarity but in practice many contacts services may be used. In some examples the predication service may be integral with the contacts service.

The recommendation system 108 is computer-implemented and arranged to use results from the prediction service 104 (where consent has been given) to make recommendations either directly to the user communications device 106 or via the prediction service 104 or in other ways.

The information retrieval system 110 comprises a search engine having an index of items 112. It may also comprise a web crawler 118, an index generator 120 and a query server 122.

The generator 116 may be used to identify items and or target users for which predictions are to be generated. For example, by identifying target users and or items where coverage is low.

In the examples described with reference to FIGS. 2 and 3 the contacts are friends of a target user. However, this is not essential. The examples also apply where the contacts are from a professional network, or are any other contacts, or contacts of contacts of the target user.

Figure 2:
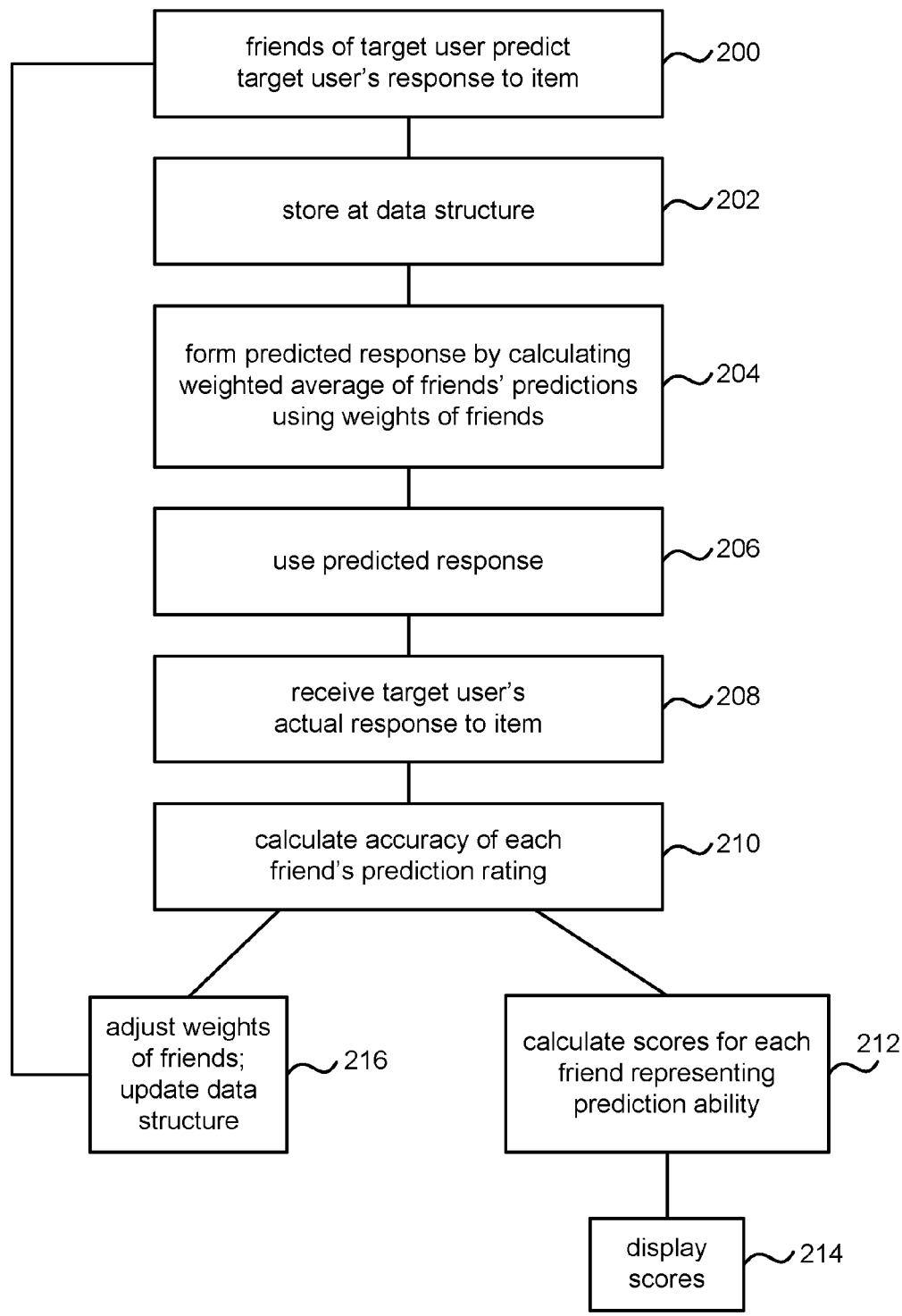
FIG. 2 is a flow diagram of a method of predicting and using user responses.
Figure 3:
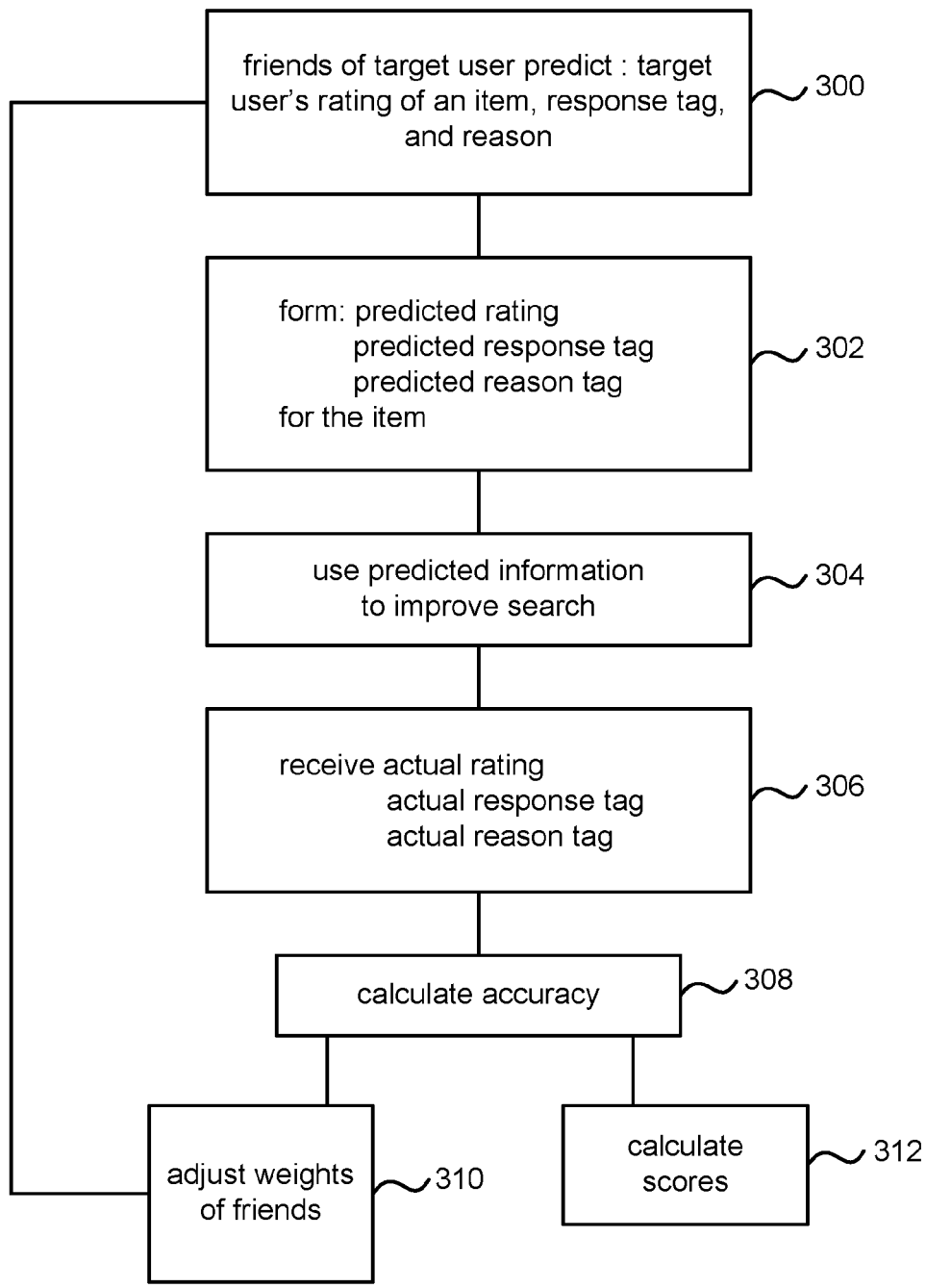
FIG. 3 is a flow diagram of a method of predicting user ratings, response tags and reasons.
Figure 4:
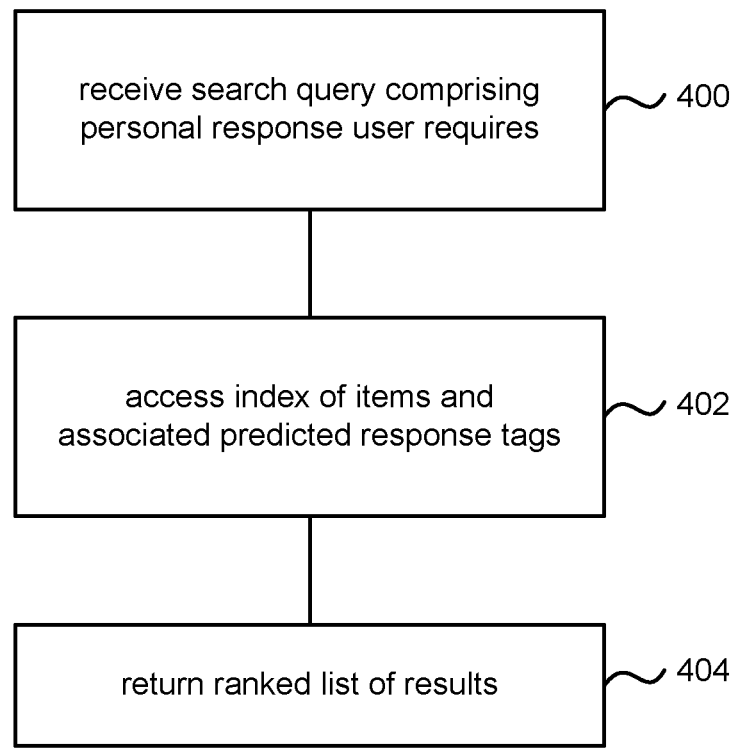
FIG. 4 is a flow diagram of a method of information retrieval.
Figure 5:
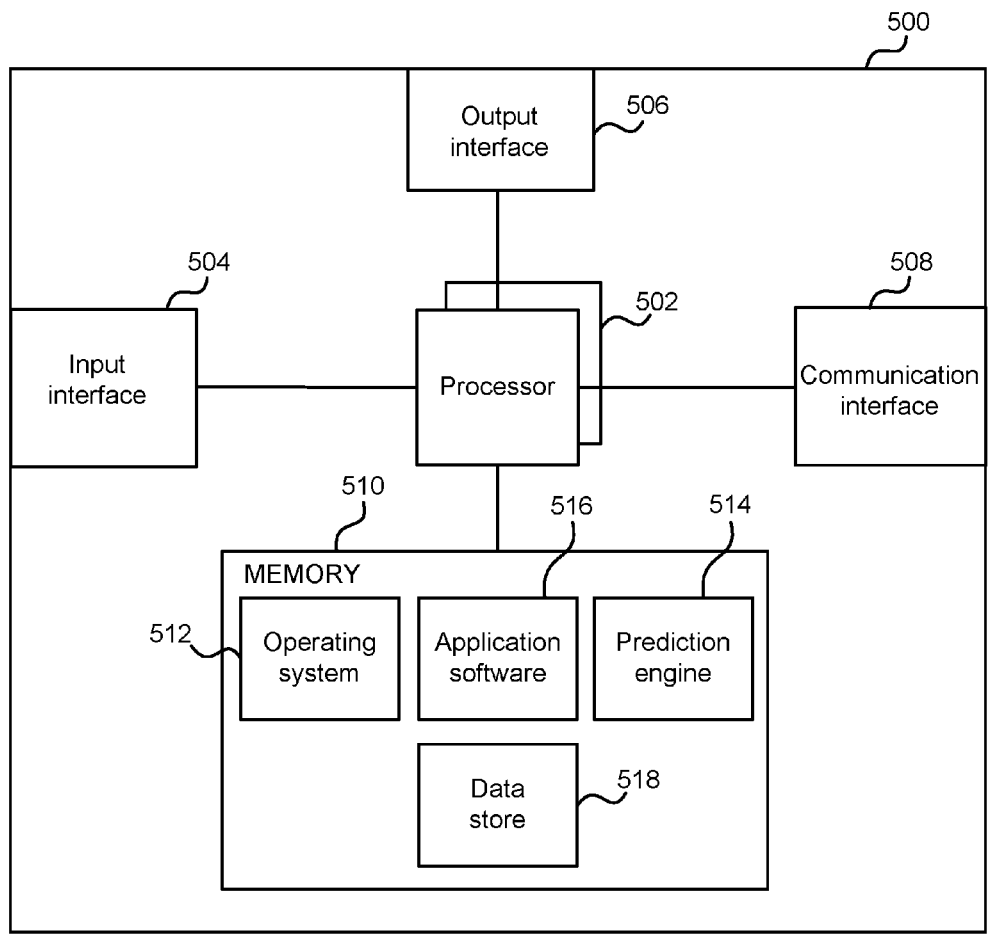
FIG. 5 illustrates an exemplary computing-based device in which embodiments of a prediction system may be implemented.

FIG. 2 is a flow diagram of a method of predicting and using user responses. The prediction service 104 elicits predictions from friends of a target user. This may be achieved by sending messages to the friends requesting that they made predictions and/or by displaying a web page requesting the predictions for the target user in respect of specified items. The generator 116 may provide input to the prediction service 104 to identify which target user and/or which specified items to use. The friends of the target user are identified from the contacts service 102 as being associated with the target user. For example, they may be contacts of the target user or contacts of contacts of the target user.

Friends of a target user make predictions of the target user's response to a specified item. In some examples only one friend may make a prediction. The predictions are sent from communications devices of the friends to the prediction service in any suitable manner. For example, by receiving user input at a graphical user interface displaying a web browser, by sending email or short message service messages to the prediction service, or in other ways.

As mentioned above a response may be a rating, numerical score, descriptive phrase or word. For example, in the case of a rating, a scale of 0 to 10 may be used with 10 being the most favorable rating. In the case of a descriptive phrase or word the response may be referred to as a response tag and comprises a descriptive phrase or word either selected from a specified set of response tags or generated spontaneously by the friend. In addition to predicting the target user's response to a specified item, a friend may also predict a reason for that response. For example, this reason may comprise a word or phrase. In an example, a friend may make predictions for a target user's response to a particular science fiction movie. The predictions may comprise a predicting rating of say 4.7 out of 10, a predicted response comprising the word "silly" and a predicted reason comprising the word "aliens". In another example, another friend may make predictions for the same target user's response to the same science fiction movie. The predictions may comprise a predicted rating of say 7.6 out of 10, a predicted response comprising the word "nice" and a predicted reason comprising the word "action".

As the predictions are received at the prediction service they are stored 202 using a data structure (such as weights of contacts 114 database) which enables predictions for specified target user's to be accessed quickly and accurately. The prediction service scales up to operate for tens of thousands of target users or more and consequently the amounts of data to be processed are very large since each target user has potentially hundreds or more predictions. The data structure also holds a weight for each target user and friend combination. It can be seen that this is a very large number of weights each being a numerical value. Initially, where the target user and friend combination has not previously been observed by the prediction system, the weight is initialized to a default value. The weights may be updated as described in more detail below. It is also possible for finer grained weights to be stored. For example, weights may be stored for combinations of target user, friend and set of items or individual items. Where a friend is good a predicting a target user's opinion about movies he or she may not be good at predicting a target user's opinion about grocery items. By using finer grained weights this may be taken into account. As a result the amount of data to be stored and managed by the prediction service is significant and the data structure is arranged to enable this data to be stored efficiently such that it may be accessed in real time. For example, weights which do not differ by more than a specified threshold from the default may be removed from the data structure during a pruning process carried out at intervals.

The data structure stores one or more features for each item. For example, this may be an identifier of the item such as a numerical identifier or a string comprising a name of the item. Another feature may be an identifier of a class or category that the item is a member of.

A processor at the prediction service forms a predicted response of the target user to the item by calculating 204 a weighted average of the friends' predictions using the weights of the friends. The data structure is accessed to retrieve the current weights of the relevant friends and the friends' predictions and calculate the weighted average. In the case that the friends' predictions are numerical scores or ratings the process of calculating the weighted average comprises rescaling any scores that are on different scales so that the scales are compatible, weighting the rescaled scores using the appropriate weights, and combining the scores before dividing by the total number of scores used.

In the case that the friends' predictions are words or phrases the process of calculating the weighted average may comprise converting the words or phrases into numerical values on a compatible scale and then calculating the weighted average. The numerical weighted average may then be mapped back into a word or phrase. To convert the words or phrases into numerical values the prediction service may use a predefined mapping of words and phrases into numerical values or ratings. For example, "nice" may map to a higher numerical score than "cool" where a high numerical score represents a favorable opinion. The predefined mapping may be established in advance using empirical data.

Where the friends' predictions comprise both numerical ratings and words or phrases the words or phrases are converted to numerical values on the same scale as the numerical ratings.

The predicted response is then used 206, for example by the recommendation system 108 of FIG. 1 or the information retrieval system 110 of FIG. 1. This is described in more detail later in this document.

The prediction system receives 208 the target user's actual response to the item. The actual response may be actively prompted from the target user by operation of the prediction system or may be passively observed by the prediction system or any other entity. In the active case the prediction system may send a message to the target user requesting his or her response or may post or display information at a web page requesting the response. The active seeking of the target user's response may be independent of whether the target user has experienced the item. In other examples, the active seeking of the target user's response occurs once the prediction service is informed that the target user has experienced the item. For example, the prediction service may receive an alert from another entity indicating that the target user has experienced the item. For example, the other entity may be an on demand media service which alerts the prediction service when a target user accesses a movie (provided appropriate consents have been obtained). In another example, the other entity may be an online grocery store which alerts the prediction service when a target user purchases a particular grocery (provided appropriate consents have been obtained). In another example, the other entity may be an information retrieval system which alerts the prediction service when a target user clicks on a search result associated with the item (where appropriate consents have been given).

In some examples the target user is encouraged or rewarded for giving his or her actual response to the prediction system. For example, the reward may be access to the friends' predictions about the target user which are otherwise hidden from the target user. For example, a web page generated by the prediction service may display identifiers of friends who have made predictions together with the friends' predictions in a locked form and a request for the target user to enter his or her actual response. Once the actual response is entered the prediction service unlocks the friends' predictions which are then revealed on the web page. In other examples, the reward may be points or credits which accrue to the target user. In other examples, the service allows the target user to view an aggregate of the friends' predictions and once the target user has entered the actual opinion the full details of the individual friends' predictions are revealed. In another example, the target user is able to view the friend's predictions at any stage and when doing so a message is sent to the friends to inform them.

A tradeoff exists between locking friends' predictions for motivation and unlocking those predictions for usefulness. That is, a prediction for an item that a target user has not experienced has reduced value to the target user if it is locked. In some examples individual predictions are locked but average predictions are shown to the target user so he or she obtains the usefulness yet not the individual predictions. In other examples the individual friends' predictions are shown but the user names of the friends are locked. In this case a target user is not biased to reward points to certain predictors. In other examples, friends' predictions are locked and a "request to unlock" button is displayed so that if a target user clicks that then he or she is shown the prediction, but scores are not calculated for this prediction. Instead the predictor may get a "thank you" point as a reward rather than an accuracy score.

The prediction system calculates 210 the accuracy of each friend's prediction by comparing the target user's actual response with each of the friend's predictions. Where the friend's prediction and the target user's actual response are on different numerical scales, rescaling is carried out prior to the comparison. Where the predictions and actual responses comprise words or phrases they may be compared by analyzing semantic or syntactic similarities using resources such as a computer-implemented thesaurus to analyze similarities. It is also possible to map the words or phrases into numerical scores using any specified mapping before making the comparison. In some examples the accuracy of predictions may be calculated by allowing the target user to mark good predictions as correct and mark bad predictions as incorrect.

The calculated accuracy of each friend is used to adjust the weights of the friends 216 and update the data structure with the adjusted weights. The update process comprises using an update rule to change the value of the weight depending on the accuracy and optionally other factors. Different update rules may be used for different friends and/or for different items or categories of item. For example, the update rule may change the value of the weight in direct proportion to the accuracy or according to other relationships. The update rules may be stored at the prediction service or at any other location accessible to the prediction service.

In some examples the friends are encouraged or rewarded for making predictions. The reward may be points, scores or credits which accrue to the friends. In an example, the prediction service calculates 212 scores for each friend representing his or her prediction ability. The scores are calculated using the accuracy and optionally other factors such as whether the friend was the first friend to make a prediction. The scores may be displayed 214 at a web page or other display generated by the prediction service and accessible to the friends and/or the target user. A ranking may be displayed of friends in terms of the friends' abilities to predict the target user's opinion. In examples the scores may relate to how well a friend knows a target user, how good a predictor the friend is in general, how good a predictor the friend is in specialized categories such as entertainment, sports, politics. The scoring introduces a competitive aspect which encourages predictions to be made.

An example where three friends (Rosanna, Chris and Adrian) make predictions for a target user M is now described with reference to FIG. 3. The item is a particular science fiction movie. The friends each enter 300 a predicted rating, predicted response tag and predicted reason. For example, Rosanna may predict that M's rating will be 9.3 out of 10, that M's response tag will be "great" and that M's reason will be "sci-fi". Adrian may predict that M's rating will be 8.5 out of 10, that M's response tag will be "cool" and that M's reason will be "sci-fi". Chris may predict that M's rating will be 4.2 out of 10, that M's response tag will be "boring" and that M's reason will be "no aliens". The prediction service accesses a weight for each friend from the data structure and calculates 302 a predicted rating, predicted response tag and predicted reason for the item. The predicted information is optionally used 304 as described in more detail later in this document.

Target user M is able to access a web site having a first web page displaying recent and popular topics. Target user M is able to select one of the existing topics or create a new one. When a topic is selected a web link to the topic or item such as a movie, product description, document, music track, or other item is displayed at a web page together with a list of friends who have made predictions of target user M's opinion of the topic or item. The predictions may comprise a predicted rating, a predicted response tag and a predicted reason and these predictions may all be locked from view of the target user M. The target user is able to enter his or her actual opinion to reveal the friends predictions and optionally other information such as an aggregate of the actual opinions of the friends about the item. An accuracy is calculated 308 for each friend. In the example where there are three friends Rosanna, Adrian and Chris, M's actual rating may be 9.1 out of 10 with a response tag of "excellent" and a reason "character name". The prediction accuracy for Rosanna may then be 97%, for Adrian 93% and for Chris 46%. Scores for the friends are calculated 312 using the accuracy values and optionally other information. The weights of the friends are adjusted 310 as described above with reference to FIG. 2.

More detail about how the predictions may be used is now given.

In an example the predictions are used to make recommendations to the target user either directly from the prediction service or using a recommendation system 108 or in other ways. For example, the prediction service may send an email message, short message service message, or other message to the target user with the predicted response information. In another example, the target user is presented with the predicted response information the next time he or she accesses a service which provides the item. For example, when the target user accesses an online music store he or she may be presented with recommended items and friends predictions of his or her response. In this case, the prediction service is arranged to send the predicted response information to the relevant service.

By rewarding friends for making predictions improved coverage is achieved in that friends tend to volunteer predicted opinions more often. The use of rewards, published scores and ranks of prediction ability also tends to improve the accuracy of the predictions and the sophistication of the predictions that are made. In this way the quality of personalized information retrieval and recommendation services are enhanced.

Examples in which the predictions are used to improve information retrieval are now described. Information retrieval systems such as web search systems enable users to find web sites (or documents or other items) that suit their requirements. The web sites, documents or other items may correspond or relate to the items for which opinions are predicted by the prediction service. For example, friends may predict a target user's response to a new movie. Web sites, documents, music tracks or other items associated with the new movie are available using an information retrieval system. The information retrieval system may exploit the predictions to improve the relevance of the search results it generates. At least three main components are used in information retrieval systems: web crawlers; index generators; and query servers.

Web crawlers crawl the web one link at a time and send identified web pages to be indexed. This is achieved by making use of links between web sites. This web crawling process can be thought of as a continual process of identifying new web sites and identifying updates to existing web sites.

The crawling process enables many billions of web pages to be identified and in order to make use of this information a systematic way of retrieving pages is required. An index generator provides part of this facility. The index generator identifies keywords to associate with each website's content. Then, when you search for those keywords, the search system may find the most appropriate pages out of the billions that are available. In some examples, the index generator may also associate response and reason tags for specified users with at least some of the websites, documents or other items being retrieved.

The index generator includes such information as how often a term is used on a page, which terms are used in the page title, or in the index, for the subsequent use of the query server in ranking the documents. Other information such as the language that the web site is written in and information about how many other web sites link to the web site concerned can also be used. In examples described herein the index generator is arranged to use friends' predictions of the target user's response in the index generation process. For example, the index generator may use one or more of: the predicted rating, predicted response tag and predicted reason. The index generator may have access to the predictions from the prediction service. For example, the index generator is able to access a data structure of the prediction service which holds at least predicted responses of target users and features of items for which the predictions are made.

A query server (also referred to as a search engine) is used to rank the index documents on the basis of how well they match user input search terms. The query server analyses the user search terms and compares them with the indexed web pages. It generates a rank or score for the indexed web pages on the basis of the user input search terms. In this way, web pages relevant to the user search terms are identified with scores or ranks to indicate the degree of likelihood of relevance. In examples the ranking algorithm used for generating the rank or score may take into account the predictions from the prediction service.

In an example, a target user is able to use the information retrieval system 110 to search for items that are likely to provoke a particular response in the target user. For example, to search for items that the target user is likely to think are "great". An information retrieval system receives 400 a search query comprising a personal response that the user requires. For example to search for items with a predicted response tag of "delicious dessert". The query server compares the search query with indexed web pages (or other items) and generates a rank or score for the indexed web pages. The index has been formed using predictions from the prediction service as described above. The ranked list of results is returned 404 and this enables the end user to obtain a "response based" search. In this way results which are of personal interest to the end user are obtained as opposed to search results which are related to the general opinion of many users. The results list comprises items that the target user's friends have collectively predicted that the user will personally find delicious. Predicted reasons may be displayed together with the results and give insight to the user as to why they may be interested in the item.

In another example, a target user enters a search query comprising keywords or phrases in order to search for a particular item. The query server generates a ranked list of results in response to the key words using an index that may or may not take into account predicted responses. It also accesses any relevant predicted responses from the data structure of the prediction service in real time. Any relevant predicted ratings, responses and reasons may be displayed together with the ranked list of results. For example, using pop up displays which appear when a user hovers a user input selector over a result in the list or as any other annotations next to search results.

In another example, a target user enters a search query comprising keywords or phrases in order to search for a particular item. The query server generates a ranked list of results in response to the key words using an index that does not take into account predicted responses. The results are then prioritized using the predicted ratings from the prediction service.

FIG. 600 illustrates various components of an exemplary computing-based device 500 which may be implemented as any form of a computing and/or electronic device, and in which embodiments of a prediction service or an information retrieval system may be implemented.

The computing-based device 500 comprises input interface 504 arranged to receive input of any suitable type such as media content, Internet Protocol (IP) input, or other input. The device also comprises output interface 506 arranged to output predictions and/or search results. The output interface 506 may provide an audio and/or video output to a display system integral with or in communication with the computing-based device. The display system may provide a graphical user interface or other user interface of any suitable type although this is not essential. In some examples the input and output interfaces are integral and in the form of a web-based interface for enabling friends of target users to enter opinions and view web pages displaying scores, rankings, predicted ratings, predicted responses, predicted reasons and other information. The device also comprises communication interface 508 to enable the device to communicate with other entities over a communications network of any type such as the internet, an intranet, or other communications network.

Computing-based device 500 also comprises one or more processors 502 which may be microprocessors, controllers or any other suitable type of processors for processing computer executable instructions to control the operation of the device in order to predict responses of target users to items and/or to act as an information retrieval system. In some examples, for example where a system on a chip architecture is used, the processors 502 may include one or more fixed function blocks (also referred to as accelerators) which implement a part of the method of predicting responses and/or information retrieval in hardware (rather than software or firmware). Platform software comprising an operating system 512 or any other suitable platform software may be provided at the computing-based device to enable application software 516 to be executed on the device. A prediction engine 514 implemented in software is provided at the computing based device to predict responses as described in the examples herein. A data store 518 stores a data structure holding weights, predicted ratings, predicted response tags, predicted reasons, aggregate values, target user identifiers, item identifiers and other data. The data store 518 may also store thresholds, accuracy measures and scores. In the case that the computing based device acts as an information retrieval system the prediction engine may be replaced by an index generator, query engine and optionally also a web crawler. The data store 518 may hold an index, ranked search results, a ranking algorithm and other data.

The computer executable instructions may be provided using any computer-readable media that is accessible by computing based device 500. Computer-readable media may include, for example, computer storage media such as memory 510 and communications media. Computer storage media, such as memory 510, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 510) is shown within the computing-based device 500 it will be appreciated that the storage may be distributed or located remotely and accessed via a network or other communication link (e.g. using communication interface 508).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of predicting a target user's response to an item comprising:
   accessing a computer-implemented contacts service to identify a plurality of second users associated with the target user by the contacts service;
   storing, at a data structure, a plurality of second user weights, the plurality of second user weights including a second user weight for each second user of the plurality of second users;
   eliciting predicted responses of the target user from the plurality of second users, a predicted response directed toward the item and indicating an opinion of the item predicted to be held by the target user, the elicitation including the identity of the target user, the identity of the target user being different from the identities of the plurality of second users, each predicted response and associated identity from a second user of the plurality of second users being hidden from the target user;
   in response to receiving the predicted responses of the target user to the item from the plurality of second users, calculating an average predicted response of the target user to the item, including combining the elicited predicted responses from the plurality of second users using the plurality of second user weights to generate a weighted average of the elicited predicted responses;
   eliciting from the target user an actual response indicating an opinion of the item held by the user based on the average predicted response; and
   in response to receiving the actual response from the target user, unlocking the predicted responses and associated identities to allow access by the target user.

2. The computer-implemented method as claimed in claim 1 wherein the predicted response comprises one or more of: a response tag comprising at least one word, and a response reason comprising at least one word.

3. The computer-implemented method as claimed in claim 1 wherein combining the predicted responses comprises mapping at least some of the predicted responses from words to numerical values using a specified mapping.

4. The computer-implemented method as claimed in claim 1 wherein eliciting the actual response from the target user further comprises:
   calculating an accuracy of an individual predicted response by comparing the actual response and the individual predicted response.

5. The computer-implemented method as claimed in claim 4 wherein the actual response and the individual predicted response comprise text, and wherein calculating the accuracy of the individual predicted response further comprises:
   comparing a semantic or syntactic similarity of the actual response and the individual predicted response.

6. The computer-implemented method as claimed in claim 4 further comprising:
   calculating a score for at least one second user based on the accuracy and displaying the score to the at least one second user.

7. The computer-implemented method as claimed in claim 4 further comprising:
   adjusting at least one second user weight of the plurality of second user weights associated with at least one second user of the plurality of second users from whom the individual predicted response was elicited on the basis of the accuracy of the individual predicted response and storing the adjusted at least one second user weight at the data structure.

8. The computer-implemented method as claimed in claim 4 further comprising:
   calculating a ranking of the plurality of second users; and
   displaying the ranking to the plurality of second users and the target user.

9. The computer-implemented method as claimed in claim 1 further comprising:
   displaying the predicted responses to the target user without the names of the plurality of second users.

10. The computer-implemented method as claimed in claim 1 further comprising:
    displaying an aggregate of the predicted responses to the target user; and
    responsive to receiving the actual response, displaying the predicted responses to the target user.

11. The computer-implemented method as claimed in claim 1 further comprising:
    receiving a search query from the target user;
    sending the search query to an information retrieval system and receiving a ranked list of search results; and
    annotating at least one of the search results using at least one of the predicted responses.

12. The computer-implemented method as claimed in claim 1 further comprising:
    receiving a search query from the target user;
    sending the search query to an information retrieval system and receiving a ranked list of search results; and
    changing a rank of at least one of the search results using at least one of the predicted responses.

13. The computer-implemented method as claimed in claim 1 further comprising:
    using the predicted responses to make a recommendation of the item to the target user.

14. The computer-implemented method as claimed in claim 1 wherein the plurality of second user weights include second user weights associated with a combination of a target user and a second user.

15. The computer-implemented method as claimed in claim 1 further comprising:
pruning the plurality of second user weights by removing second user weights that differ from a defined default weight value by less than a specified threshold from the data structure.

16. An information retrieval system comprising:
at least one processor;
a query engine implemented on the at least one processor that receives a query and retrieves a ranked list of items from an index of items;
an index generator that generates the index of items at least on the basis of predicted responses of a plurality of target users to a plurality of the items, each of the predicted responses having been generated by:
  accessing a computer-implemented contacts service to identify a plurality of second users being associated with at least one target user of the plurality of target users by the contacts service;
  eliciting predicted responses of the at least one target user from the plurality of second users, a predicted response directed toward an item of the plurality of items and indicating an opinion of the item predicted to be held by the at least one target user;
  storing a second user weight for each of the plurality of second users;
  calculating a prediction of the at least one target user's response to the item by combining the predicted responses from the plurality of second users using second user weights of the plurality of second users to generate a weighted average of the predicted responses; and
a prediction generator arranged to identify at least one item of the plurality of items and the at least one target user of the plurality of target users having a number of predicted responses below a threshold value and elicit, from at least one of the plurality of second users, a predicted response of the at least one target user of the plurality of target users to the at least one item of the plurality of items;
wherein, in response to receiving an actual response from the at least one target user indicating an opinion of the item held by the at least one target user, the prediction of the at least one target user's response is provided to the at least one target user.

17. The information retrieval system as claimed in claim 16 wherein the query engine retrieves annotations comprising the predicted responses associated with the ranked list of items.

18. A web server comprising:
a first input arranged to access a computer-implemented contacts service to identify one or more second users being associated with a target user by the contacts service;
a web-based interface arranged to obtain predicted responses of the target user from the one or more second users, a predicted response directed toward an item and indicating an opinion of the item predicted to be held by the target user, the predicted responses and associated identities of the one or more second users being hidden from the target user;
a memory storing a data structure holding second user weights of the one or more second users;
a processor arranged to calculate a prediction of the target user's response to the item by combining the predicted responses from the one or more second users using the second user weights;
a second input arranged to receive the target user's actual response to the item, the actual response indicating an opinion of the item held by the target user;
the processor further arranged to provide the predicted responses and associated identities of the one or more second users to the target user in response to receiving the actual response from the target user; and
the processor further arranged to calculate a plurality of scores for each of the one or more second users, each of the plurality of scores being associated with one of a plurality of prediction categories.

19. The web server as claimed in claim 18, the web based interface being arranged to obtain the actual response to the item from the target user and, the processor being arranged to:
calculate an accuracy of each of the predicted responses by comparing the actual response and the predicted responses; and
adjust accuracy scores of the one or more second users based on the calculated accuracy of the predicted responses.

20. The web server as claimed in claim 19 wherein the actual response and the predicted responses comprise text and the processor is arranged to calculate the accuracy by comparing the semantic or syntactic similarity of the actual response and the predicted responses.

* * * * *